Patented Sept. 23, 1941

2,256,853

UNITED STATES PATENT OFFICE 2,256,853

PAPER PRODUCT

George L. Schwartz, Wilmington, Del., assignor to E. I. du Pont de Nemours & Company, Wilmington, Del., a corporation of Delaware No Drawing. Application June 1, 1938, Serial No. 211,296

1 Claim. (Cl. 91—68)

This invention relates to paper and more particularly to the manufacture of coated and grease-proof paper products.

Glues, gelatins, caseins, starches, modified starches, and vegetable proteins have been applied by the known methods for modifying the surface properties of paper. These materials are used chiefly alone or pigmented or in combination with dyes, softeners, antifoams, etc., to modify the printing characteristics of paper by controlling the amount, rate, or uniformity of ink penetration. These coating and sizing agents, however, contribute grease-proofness only when used in such amounts as will make the paper too stiff for some uses, and have the further objection that the surface tends to be sticky in warm moist atmospheres and brittle in dry atmospheres.

Among the agents mentioned above for treating paper, starches are valuable because they can be dissolved readily in water simply by heating to about 90° C., they can be used as neutral solutions, they do not discolor the paper or pigments, and they are available in large amounts at relatively low cost. But starch treated papers have drawbacks since they are too brittle and their pigmented coatings do not polish well in calenders. Starch softeners, such as glycerin, overcome the cracking tendency but they reduce calender polishing and make the starch film too soft and sticky in warm moist atmospheres. For unpigmented coatings where ink resistance and improved surface feel are required, glues are applied. Even the highest grade glues develop odors in moist warm atmospheric conditions and the surface is sticky under most conditions. Starch films may be applied in sufficient thickness to alter the printing properties but the greater film thickness required for complete grease-proofness is too brittle for use. The most serious inherent defects of starch in imparting resistance to penetration of greases, inks, etc., are that the paper tends to crack when clay or other pigmented coatings of this material are applied to paper and that softeners, such as glycerin or invert sugars, reduce adhesive value and develop stickiness and low film strength under warm, moist atmospheric conditions.

For heavy pigmented coatings, casein has been used almost exclusively as the adhesive because of its high adhesive value, water resistance, and polishing properties. But casein has the disadvantage of spoilage, discoloration on heating, and of requiring alkali for solution which causes foaming in aqueous systems and degradation of the paper.

This invention has as an object a modified starch treated paper which is free from the above mentioned disadvantages. A further object is the production of partially or completely grease-resistant surfaces on paper or paper products. A still further object is the production of a pigmented surface on paper for printing purposes in which the degree of ink acceptance can be regulated. Other objects will appear hereinafter.

These objects are accomplished by the following invention in which paper, paper products, and similar fibrous materials are provided with an impervious coating comprising polyvinyl alcohol and starch, either with or without pigments, softeners, wetting agents, or insolubilizing agents, as described more particularly hereinafter.

I have discovered that when a small amount of polyvinyl alcohol is blended with the starch the coating is not brittle nor is it softened by the polyvinyl alcohol, and that the products obtained are superior to those in which starch alone is used as the coating agent in that the paper may be creased to a greater extent without cracking the film, a smaller ratio of adhesive to pigment is required, and thinner films impart good grease resistance. These coating compositions comprising starch and polyvinyl alcohol have excellent grease and oil resistance and excellent adhesive strength for binding pigments to the paper surface, and they do not curl so much in the printing operation as casein coated papers.

Polyvinyl alcohol is a tough, water-white, resin-like material which is usually obtained by the hydrolysis of polymerized vinyl esters, such as polyvinyl acetate. The polymers that are useful in this invention are all soluble in hot water and slowly dissolved or swollen in cold water but after solution is effected by hot water they remain in solution when cooled. Polyvinyl alcohol having a viscosity of 20 to 100 centipoises may be used in the practice of this invention but the viscosities usually used are above 20 centipoises. Viscosities of 45–90 centipoises are preferred. The viscosities of the polyvinyl alcohols given herein are intrinsic viscosities, which are determined on a 4% aqueous solution of the polyvinyl alcohol at 25° C.

A large variety of starches may be used. Where high solids content is required a low viscosity starch is used. Where lower solids content is required the higher viscosity starches may be used. For efficient operation the viscosity of the coating composition at 25° C. should not be above 40 seconds for a 50 cc. drainage from a Number 10 cup. A range of 12–15 seconds drainage time is preferable.

In carrying out the invention an aqueous solution of the polyvinyl alcohol is mixed with starch in a completely swollen or unswollen condition. This composition may be used with or without pigment to produce various degrees of imperviousness to grease, oils, and inks. The unpigmented coating compositions may be applied to the paper surface by spreading with a doctor knife, followed by drying. It is finished into a smooth polished surface by calendering at room temperature or at elevated temperatures. Sprays, coating rolls or tub size rolls may be used to produce desired results depending on the condition of the paper base and the degree of imperviousness desired. The coating composition may be applied to the sheet at various stages after sheet formation such as at the wet presses, in a tub size press where partial drying has occurred, in water boxes in the calender rolls, or by a special coating process of the dried finished paper base.

Pigmented coatings of this adhesive composition may be applied in large amounts to paper by spreading, then smoothing with soft brushes, drying and calendering. For high grade coated papers that require good printing properties and smooth surface, about 15 parts of the adhesive composition is required per 100 parts of clay. However, some pigments require a lower or higher ratio of adhesive compositions. Comparable coatings in which starch is used alone as the adhesive require from 22 to 30 parts of starch, which must be of a lower viscosity than that which may be used with polyvinyl alcohol.

Clays, chalk, calcium sulfite, blanc fixe, titanium dioxide, titanium dioxide extended with low opacity pigments, lithopone and colored pigments may be used. Highly alkaline pigments, such as satin white, cause foaming of the coating composition and require a higher ratio of adhesive.

The calender temperature may be higher than that which can be used for casein adhesives without developing dark coatings. Pigmented coatings may be applied to each side of the paper in amounts up to half the weight of the paper base for each side without developing blisters or flaking off. Amounts as low as 1 pound per 3,000 square feet applied to one side of a sheet of paper will produce a uniform surface with appreciable resistance to oil base ink.

The degree of ink resistance increases with the ratio of the adhesive to the amount of pigment used. For papers to be used in high speed printing the ratio of adhesive to pigment is adjusted to be just enough to supply sufficient adhesion for the pigmented coating to print well. When a small amount of polyvinyl alcohol is blended with the starch, the total adhesive content required is less thus giving better ink acceptance.

The following examples are illustrative of methods that may be used for carrying out the invention:

*Example I*

Polyvinyl alcohol (75 centipoises)—6% solution _____ 200
Corn starch (cooked, low viscosity)—5% solution _____ 1400
Formamide _____ 10
Water to make _____ 2000

The above composition was applied to the extent of 4.5% solids, based on the dry weight of the fibers, to one side of a 20-pound so-called "grease-proof" paper and calendered with 30% moisture. The sheet was transparent and had a turpentine resistance of 240 minutes.

The turpentine resistance of the same so-called "grease-proof" paper used in the above example after treatment with an aqueous solution of glycerol in sufficient amount to absorb 7% glycerol, based on the dry weight of the fibers, and finished in the same manner, was 78 minutes.

When the corn starch of the foregoing example was used alone in 10% solution to an absorption of 4.5% starch, based on the weight of the fibers, and finished in the same manner, the sheet obtained was less transparent and had a turpentine resistance of 214 minutes.

Grease-resistance is expressed in terms of resistance to penetration by turpentine. The turpentine resistance was determined on the paper at 25° C., 50% relative humidity, by the following method: Sixteen samples 2" square were cut from representative areas of each roll of paper. These were placed on a smooth white paper, which served as the "tell-tale". One inch squares of blotting paper (kerosene absorption 350%) 0.050" thick were placed on each test sample. Then 0.4 cc. of anhydrous turpentine, colored with a red dye, was applied from a burette to the blotting paper square and a 1" cube of brass was placed promptly on this. The test samples with blotter and brass cube were moved along the surface of the "tell-tale" paper at intervals to determine time at which the "tell-tale" sheet was marked by the colored turpentine. The turpentine resistance is expressed as the average of all sixteen tests.

*Example II*

Polyvinyl alcohol (75 centipoises) 6% solution _____ 125
Low viscosity cooked corn starch 15% solution _____ 50
Water _____ 225

A white coated 60-pound paper containing casein and clay was printed in a standard printing press, coated with the above composition to 9.2% solids and then dried. The finish was smooth and glossy and the printing contrast was excellent.

*Example III*

A 50-pound bond paper was tub sized with the same composition as in Example II except that the composition was heated to 50° C. Total solids applied on both sides was 4.8%. The coated paper was dried and then calendered. The finished paper was smooth and required a very small amount of printing ink to give good printing results.

The examples given below include clay as a pigment and were made to contain 30% solids. The pigment was made into a paste by stirring with water. Between 29 and 31% coating solids (based on paper base weight) was applied to each side of the sheets. The polyvinyl alcohol solution was then added to disperse the clay and the starch in solution was added with stirring to complete dispersion. The viscosity of the coating composition was determined as the seconds required for 50 cc. to pass through a Number 10 cup at 25° C. A 30-pound bleached sulfite machine calendered paper was used as the base material. The coating was applied by means of a coating brush and this was promptly smoothed with a soft brush. The freshly coated sheets were dried by heating in a chamber at 75° C. except where unswollen starch was used. The unswollen starch coatings were treated by passing the uncoated side against a smooth steam heated drying cylinder to swell the starch promptly before an appreciable amount of moisture was evaporated. Drying was completed by passage through a chamber heated at 75° C. The dried coated sheets were supercalendered in a calender stack made of alternate chilled iron and paper covered rolls. The standard wax pick test was used to determine adhesive strength. Standard "K & N" ink was used for "show-through," color depth and uniformity. Film toughness was determined at 25° C., 50% relative humidity on a 0.5" wide ribbon, cut in machine direction. The ends of the ribbon were placed in a clamp to form a loop with coated side out, this being attached to a 500-gram weight. A strip of steel $\frac{1}{32}$" thick by 2" by 12" was inserted into the loop with the smooth edge up. This was pulled upward at a uniform rate until the loop raised the weight off the support. The development of cracks was determined by examination with a low power binocular microscope. Calender gloss development was determined by comparison with standard coatings made from a composition containing 15% casein based on pigment content. Resistance to penetration by pyroxylin lacquer and drying oil varnishes was made by coating with standard lacquer and varnish, drying at elevated temperatures and observing the degree of penetration.

Example IV

| | |
|---|---|
| Clay | 100.0 |
| Polyvinyl alcohol | 1.5 |
| Thin boiling cooked corn starch | 12.5 |
| Water | 266.0 |
| Viscosity | 14.5 seconds |

The finished coated paper was superior to paper coated with standard casein composition in gloss, smoothness, toughness, and uniformity; and it was equal to casein products in adhesive value, "show-through," lacquer and varnish resistance, color depth and uniformity of color. The coating compositions foamed less in the coating operation than standard casein coating compositions of 14.0 seconds viscosity.

Example V

| | |
|---|---|
| Clay | 100.0 |
| Polyvinyl alcohol | 1.5 |
| Thin boiling corn starch (uncooked) | 12.5 |
| Water | 266.0 |
| Viscosity | 14.9 seconds |

The finished coated paper was superior to paper coated with standard casein compositions in gloss, smoothness, toughness, and uniformity, and resistance to curling. It was equal to casein products in adhesive value, "show-through," lacquer and varnish resistance, color depth and uniformity of colors. Its gloss was superior to Example IV. The coating composition foamed less in coating than standard casein coating composition of 14.0 seconds viscosity.

Example VI

| | |
|---|---|
| Clay | 100.0 |
| Polyvinyl alcohol | 1.0 |
| Thin boiling cooked corn starch | 19.0 |
| Water | 780.0 |

A 40-pound bleached sulfite paper containing 20% clay was treated in its partly dried stage on the primary paper machine by passing through a tub size press containing this coating composition which was held at 60–65° C. Each side received approximately 2 pounds of coating (24 x 36 x 500 sheet ream). After friction calendering it was remarkably smoother as indicated by the Beck smoothness tester than paper which had been coated after drying in a separate coating machine with standard casein clay coating of double this solids absorption and the same calender finishing.

The following are examples of other useful compositions which are formulated as indicated above:

Example VII

| | |
|---|---|
| Clay | 100.0 |
| Polyvinyl alcohol | 1.5 |
| Thin boiling cooked corn starch | 12.5 |
| Formaldehyde solution 1% | 15.0 |
| Water | 251.0 |

Example VIII

| | |
|---|---|
| Clay | 100.0 |
| Polyvinyl alcohol | 1.5 |
| Thin boiling cooked corn starch | 12.5 |
| Boric acid solution 1% | 3.0 |
| Water | 263.0 |

The ratio of polyvinyl alcohol may be varied, depending upon the properties desired, from 1% to 300% of the weight of the starch. The range of 1–5% has an extraordinary effect on the toughness of the film. The higher ranges, such as 25–50%, have increasing effect on grease resistance and transparency.

Polyvinyl alcohol can be made in a number of modifications of various degrees of polymerization, the degree of polymerization depending largely upon the extent to which the vinyl compound, from which it is made, has been polymerized. All of the modifications are to some extent soluble in water, the more highly polymerized being less easily dissolved and producing higher viscosity solutions for equivalent concentrations. There are also a number of so-called partial derivatives of polyvinyl alcohol in which some of the hydroxyl groups in the molecule are replaced with other radicals such as ester radicals. Some partial derivatives may be produced by incomplete hydrolysis of polyvinyl esters or by the incomplete reaction of polyvinyl alcohol with an aldehyde or with other compounds that react with hydroxyl groups. As would be expected, the properties of the partial derivatives of polyvinyl alcohol vary in respect to the proportion of hydroxyl radicals that have been substituted by other groups. When the hydroxyl radicals predominate, the partial derivatives have substantially the properties of polyvinyl alcohol. They are soluble in water as distinguished from acetates and acetals, which are soluble only in organic solvents. The term "polyvinyl alcohol" as used herein therefore also includes such partial derivatives that contain a sufficient number of unsubstituted hydroxyl groups to make the composition soluble in water.

Although I have cited only low viscosity corn starch in examples, starches from other sources, such as wheat, rice and potatoes, and such starches in medium and high viscosities are useful. The important property of these starches is that they must be soluble in water, preferably hot water. Certain modifications of these starches that are water soluble, such as starch acetate, starch cellulose glycolate, and methyl starch are useful.

This invention is applicable to all grades of paper in various thickness, but is less satisfactory for very absorbent papers, such as blotting papers. It is applicable also to articles that have been formed from such papers, such as boxes, bottles and tubes. It is applicable also to articles that are molded from paper making compositions, such as bottles, boxes, etc.

As many apparently widely different embodiments of this invention can be made without departing from the spirit and scope thereof, it is to be understood that I do not limit myself to the specific embodiments thereof except as defined in the appended claim.

I claim:

A grease-resistant paper having a coating consisting of a mixture of clay, polyvinyl alcohol and thin boiling cooked corn starch in substantially the following proportions by percentage:

|  | Per cent |
| --- | --- |
| Clay | 87.7 |
| Polyvinyl alcohol | 1.3 |
| Thin boiling cooked corn starch | 11.0 |

GEORGE L. SCHWARTZ.